(12) United States Patent
Fellingham et al.

(10) Patent No.: US 12,182,935 B2
(45) Date of Patent: Dec. 31, 2024

(54) METHOD AND APPARATUS FOR TRAINING A NEURAL NETWORK

(71) Applicant: Condense Reality Ltd., Bristol (GB)

(72) Inventors: Nicholas Fellingham, Bristol (GB); Oliver Moolan-Feroze, Bristol (GB)

(73) Assignee: CONDENSE REALITY LTD., Bristol (GB)

( * ) Notice: Subject to any disclaimer, the term of this patent is extended or adjusted under 35 U.S.C. 154(b) by 26 days.

(21) Appl. No.: 18/008,418

(22) PCT Filed: Jun. 3, 2021

(86) PCT No.: PCT/GB2021/051380
§ 371 (c)(1),
(2) Date: Dec. 5, 2022

(87) PCT Pub. No.: WO2021/245418
PCT Pub. Date: Dec. 9, 2021

(65) Prior Publication Data
US 2023/0230313 A1    Jul. 20, 2023

(30) Foreign Application Priority Data
Jun. 5, 2020    (GB) .................................... 2008511

(51) Int. Cl.
*G06T 17/00*    (2006.01)
*G06T 7/593*    (2017.01)

(52) U.S. Cl.
CPC .............. *G06T 17/00* (2013.01); *G06T 7/593* (2017.01); *G06T 2200/04* (2013.01);
(Continued)

(58) Field of Classification Search
CPC ..................... G06T 17/00; G06T 7/593; G06T 2207/20081; G06T 2200/04; G06T 2200/08; G06T 2207/10024; G06T 5/50; G06T 5/60; G06T 7/55; G06T 2207/10021; G06T 2207/10028; G06T 2207/20221;
(Continued)

(56) References Cited

U.S. PATENT DOCUMENTS

2020/0074661 A1*    3/2020    Anisimovskiy ........... G06T 3/02

FOREIGN PATENT DOCUMENTS

| CN | 110197464 A | 9/2019 |
| WO | WO 2019/032481 A1 | 2/2019 |

OTHER PUBLICATIONS

Shi Yan et al., European Conference on Computer Vision, EECV 2018, "DDRNet: Depth Map Denoising and Refinement for Consumer Depth Cameras Using Cascaded CNNs", Sep. 8-14, 2018.
(Continued)

*Primary Examiner* — Jeffery A Brier
(74) *Attorney, Agent, or Firm* — ONE LLP

(57) ABSTRACT

A first aspect of the invention provides a method of training a neural network for capturing volumetric video, comprising: generating a 3D model of a scene; using the 3D model to generate a high fidelity depth map; capturing a perceived depth map of the scene, having a field of view that is aligned with a field of view of the high fidelity depth map; and training the neural network based on the high fidelity depth map and the perceived depth map, wherein the high fidelity depth map has a higher fidelity to the scene than the perceived depth map has.

20 Claims, 5 Drawing Sheets

(52) U.S. Cl.
CPC ............... *G06T 2200/08* (2013.01); *G06T 2207/20081* (2013.01); *G06T 2207/20084* (2013.01)

(58) Field of Classification Search
CPC ........... G06T 2207/20084; G06T 2207/30221; G06N 3/08
See application file for complete search history.

(56) References Cited

OTHER PUBLICATIONS

Jae Won Jang et al., IEEE Access, vol. 7, Dec. 5, 2019, "CNN-Based Denoising, Completion, and Prediction of Whole-Body Human-Depth Images".

Zheng-Ning Liu et al., "High-quality Textured 3D Shape Reconstruction with Cascaded Fully Convolutional Networks", IEEE Transactions on Visualization and Computer Graphics, vol. 14, Aug. 1, 2019, pp. 83-97, XP55747617, US, ISSN: 1077-2626, DOI: 10.1109/TVCG. 2019.2937300.

\* cited by examiner

METHOD AND APPARATUS FOR TRAINING A NEURAL NETWORK

FIELD OF THE INVENTION

The present invention relates to a method and apparatus for training a neural network to capture volumetric video.

BACKGROUND OF THE INVENTION

The capture of volumetric video, i.e. 3D video, brings about challenges in the form of ensuring that the captured (and therefore projected) video is as accurate to the scene being captured as possible. For example, it can be challenging to accurately determine depth and colour measurements using the sensors capturing the scene, both of which are important for accurately recreating the scene for the purposes of volumetric video.

Some inaccuracies can be reduced by using a large number of sensors to capture the scene, but typically this is not possible due to the nature of the scene. For example, a typical scene being captured may be a boxing match, in which a large number of sensors placed around the boxing ring would obscure the view of the audience, as well as being costly and logistically challenging in terms of equipment.

SUMMARY OF THE INVENTION

A first aspect of the invention provides a method of training a neural network for capturing volumetric video, comprising: generating a 3D model of a scene; using the 3D model to generate a high fidelity depth map; capturing a perceived depth map of the scene, having a field of view that is aligned with a field of view of the high fidelity depth map; and training the neural network based on the high fidelity depth map and the perceived depth map, wherein the high fidelity depth map has a higher fidelity to the scene than the perceived depth map has.

The neural network may be trained using a scene sharing characteristics with the typical scenes it is likely to be capturing in a non-training environment (a.k.a. in a live phase). For example, if the neural network is arranged to capture volumetric video of boxing matches, the scene with which it is trained may comprise two humanoid figures in a boxing ring, each figure having boxing gloves on their hands.

Training the neural network based on the high fidelity depth map and the perceived depth map may comprise training the neural network to increase the fidelity to the scene of captured depth maps.

Training the neural network to increase the fidelity to the scene of captured depth maps may comprise training the neural network to recognise that the perceived depth map is indicative of the high fidelity depth map.

Training the neural network to increase the fidelity to the scene of captured depth maps may comprise training the neural network to increase, in less than 33 ms, the fidelity to the scene of captured depth maps. The neural network may finish processing a depth map before the next depth map is captured, at 30 frames per second. The neural network may be trained to increase, in real time, the fidelity to the scene of captured depth maps.

The method may further comprise: capturing a first colour map of the scene, having a field of view that is aligned with the field of view of the high fidelity depth map; and training the neural network based on the high fidelity depth map and the first colour map.

Training the neural network based on the high fidelity depth map and the first colour map may comprise training the neural network to recognise that a colour feature of the first colour map is indicative of a depth feature of the high fidelity depth map. Training the neural network based on the high fidelity depth map and the first colour map may comprise training the neural network to recognise that one or more colour features of the first colour map are respectively indicative of one or more depth features of the high fidelity depth map.

The method may further comprise: using the 3D model to generate a high fidelity colour map; capturing a perceived colour map of the scene, having a field of view that is aligned with a field of view of the high fidelity colour map; and training the neural network based on the high fidelity colour map and the perceived colour map, wherein: the high fidelity colour map has a higher fidelity to the scene than the perceived colour map has.

The perceived colour map may be the same as the first colour map.

Training the neural network based on the high fidelity colour map and the perceived colour map may comprise training the neural network to increase the fidelity to the scene of captured colour maps.

Training the neural network to increase the fidelity to the scene of captured colour maps may comprise training the neural network to recognise that the perceived colour map is indicative of the high fidelity colour map.

Training the neural network to increase the fidelity to the scene of captured colour maps may comprise training the neural network to increase, in less than 33 ms, the fidelity to the scene of captured colour maps. The neural network may finish processing a colour map before the next colour map is captured, at 30 frames per second. The neural network may be trained to increase, in real time, the fidelity to the scene of captured colour maps.

Generating a 3D model of a scene may comprise: capturing a plurality of depth maps of the scene; and generating a 3D model of the scene based on the plurality of depth maps. The plurality of depth maps may be captured simultaneously. Generating a 3D model of a scene may comprise: capturing a plurality of colour maps of the scene; and generating a 3D model of the scene based on the plurality of colour maps. The plurality of colour maps may be captured simultaneously.

The method may further comprise repeating the method using at least one further depth map or scene. In other words, the neural network may be trained using multiple scenes and/or multiple depth maps. The method may further comprise repeating the method using at least one further colour map.

According to a second aspect of the invention, there is provided a neural network that has been trained using the method of the first aspect.

A third aspect of the invention provides a method of capturing volumetric video, comprising capturing volumetric video using a neural network that has been trained using the method of the first aspect.

A fourth aspect of the invention provides apparatus for training a neural network for capturing volumetric video, comprising: a neural network; a plurality of cameras configured to generate a 3D model of a scene; and a processor configured to use the 3D model of the scene to generate a high fidelity depth map; wherein: a first subset of the plurality of cameras is further configured to capture a perceived depth map of the scene, the perceived depth map having a field of view that is aligned with a field of view of the high fidelity depth map; the neural network is configured to receive, as training inputs, the high fidelity depth map and the perceived depth map; and the high fidelity depth map has a higher fidelity to the scene than the perceived depth map has. The neural network may also receive a perceived colour map captured by the first subset of the plurality of cameras as a training input.

The first subset of the plurality of cameras may be a single camera.

When capturing the perceived depth map, the first subset of the plurality of cameras may be co-located with cameras of the plurality of cameras when generating the 3D model. The first subset of cameras may have the same position and orientation during capture of the perceived depth map as the co-located cameras of the plurality of cameras during generation of the 3D model.

The plurality of cameras may comprise stereoscopic cameras. The plurality of cameras may comprise time of flight cameras. The cameras may comprise one or more of: stereo RGB cameras; stereo IR cameras with IR light patterns; structured light cameras; time of flight cameras; phased time of flight cameras; LIDAR; and mono RGB camera with algorithmic depth estimation.

A fifth aspect of the invention provides apparatus for training a neural network for capturing volumetric video, comprising: a neural network; and a computer program configured to: generate a 3D model of a scene; use the 3D model to generate a high fidelity depth map; and generate a perceived depth map of the scene, the perceived depth map having a field of view that is aligned with a field of view of the high fidelity depth map, wherein: the neural network is configured to receive, as training inputs, the high fidelity depth map and the perceived depth map; and the high fidelity depth map has a higher fidelity to the scene than the perceived depth map has. The neural network may also receive a perceived colour map captured by the first subset of the plurality of cameras as a training input.

A sixth aspect of the invention provides apparatus for training a neural network for capturing volumetric video, comprising: a neural network; a first plurality of cameras configured to generate a 3D model of a scene; a processor configured to use the 3D model of the scene to generate a high fidelity depth map; and a second camera, not included in the first plurality of cameras, configured to capture a perceived depth map of the scene, the perceived depth map having a field of view that is aligned with a field of view of the high fidelity depth map; wherein: the neural network is configured to receive, as training inputs, the high fidelity depth map and the perceived depth map; and the high fidelity depth map has a higher fidelity to the scene than the perceived depth map has.

The second camera may be configured to be positioned farther from the scene than the first plurality of cameras are from the scene.

In this sense, the second camera may be used to train the neural network by feeding the network a perceived image that, being at a greater distance than the first plurality of cameras (i.e. the cameras used to generate the 3D model), has more inherent noise. An image with more inherent noise is more suitable for training, as it provides a more realistic representation of what the neural network may be faced with during operation.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
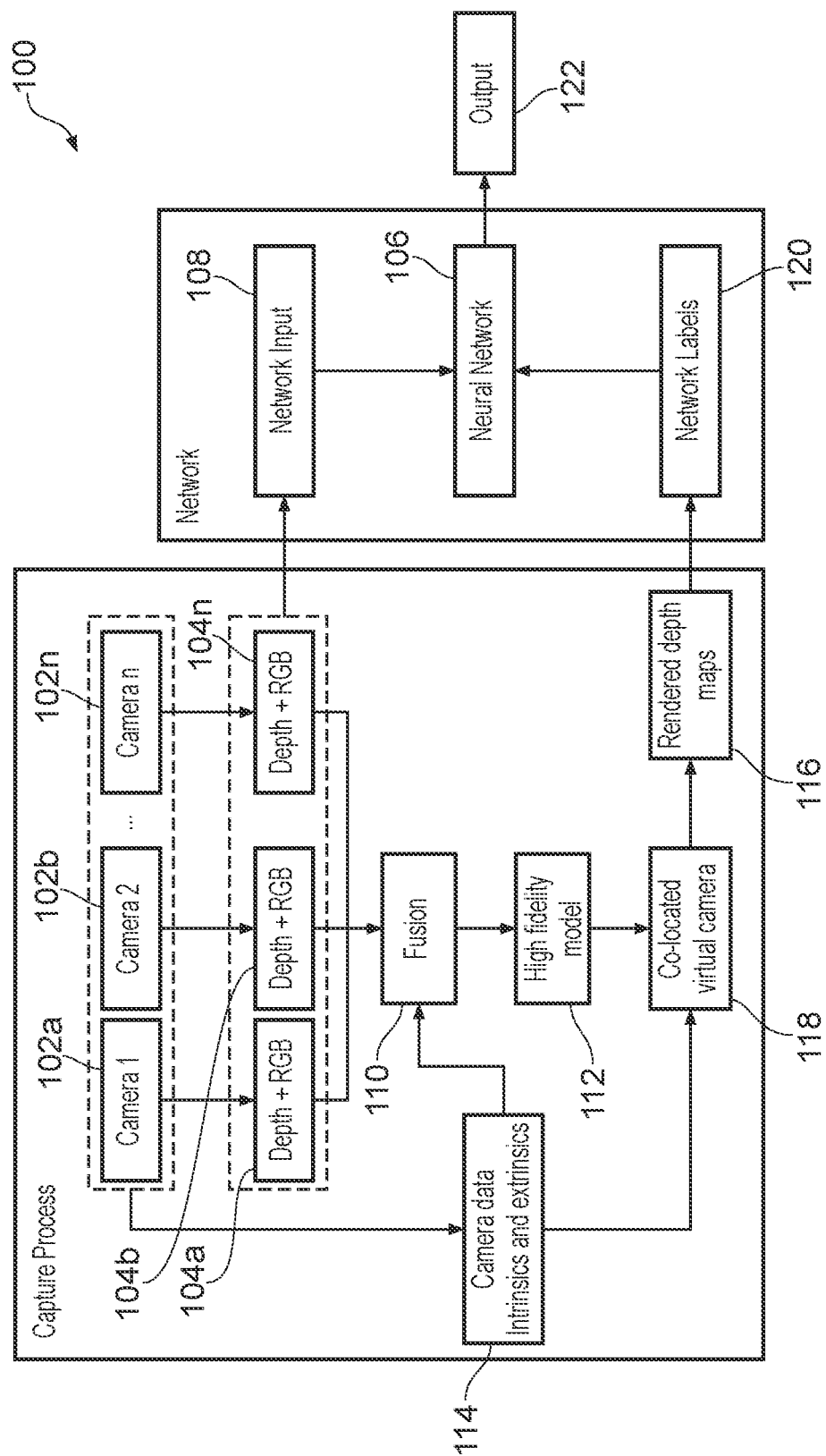
FIG. 1 is a block diagram illustrating a method of training a neural network for capturing volumetric video of a scene.

FIG. 1 shows a block diagram 100 illustrating a method of training a neural network for capturing volumetric video of a scene. A number of real-world cameras 102a, 102b, 102n are positioned around the scene to be captured. Each real-world camera 102a, 102b, 102n is capable of obtaining depth information and colour information about the scene. The cameras may be stereoscopic RGB cameras, for example.

Figure 2:
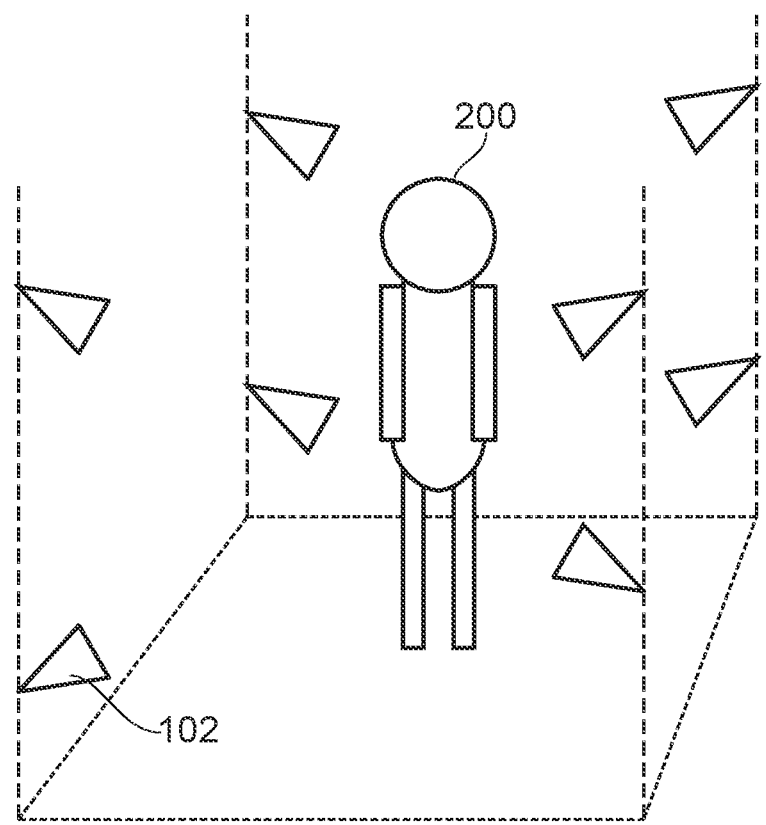
FIG. 2 is an isometric view of one possible arrangement of cameras around a scene.

FIG. 2 shows an exemplary layout of real-world cameras 102 around the scene 200. As can be seen, the real-world cameras 102 are positioned around the scene 200 at varying heights and locations, so as to enable capture of a range of different angles of the scene 200. The real-world cameras 102 are arranged so that they have overlapping fields of view with one another, whilst achieving the maximum possible coverage of the scene 200.

Turning back to FIG. 1, each real-world camera 102a, 102b, 102n outputs respective depth and RGB (i.e. colour) data 104a, 104b, 104n. In this manner, each real-world camera 102a, 102b, 102n generates a perceived depth map and a perceived colour map.

The depth and RGB data 104a, 104b, 104n also undergo a fusion process 110 to generate a high fidelity 3D model 112 of the scene. The fusion process 110 involves combining the depth maps output by the real-world cameras 102a, 102b, 102n with one another, and combining the colour maps output by the real-world cameras 102a, 102b, 102n with one another. Camera data 114 is also incorporated into the fusion process. Camera data 114 may include the position and orientation of the camera relative to the scene as well as the camera projection parameters such as field of view and lens distortion.

The alignment of the real-world cameras 102a, 102b, 102n is estimated using a technique such as marker based alignment or point cloud alignment. This provides the six degrees of freedom of the real-world cameras 102a, 102b, 102n in real 3D space (three positional degrees of freedom and three orientational degrees of freedom), relative to a known origin. The origin is typically defined by the scene being captured.

It is also ensured that the data from the multiple real-world cameras 102a, 102b, 102n is aligned in time. This can be achieved either through hardware or software synchronisation.

Following this, the set of aligned depth maps are combined into a single 3D model using a fusion technique. There are a number of different ways in which this can be performed. One method operates by extending a volume over the scene being captured. This volume is defined by a use specific bounding box. Each of the volume's cells is then iterated over, and the depth values projected to that cell from the depth maps are averaged. A 3D model in the form of a polygon mesh is then extracted from the volume.

The aligned colour maps are processed and textured onto the extracted polygon mesh.

The fusion process will operate over a number of time steps, which enables it to accumulate information about the scene over time. This reduces the noise, and fills holes in the model resulting from self-occlusions.

The result is a high fidelity 3D model 112 of the scene. The 3D model 112 is an accurate virtual recreation of the scene. In particular, the depths and colours of the 3D model 112 closely resemble those of the scene.

The 3D model 112 is used to generate a high fidelity depth map 116. A virtual camera 118 is co-located with the position and orientation of one of the real-world cameras 102*a*, 102*b*, 102*n*. In other words, the generated 3D model 112 exists in the virtual space, and the scene exists in the real-world space. The real-world cameras 102*a*, 102*b*, 102*n* exist in the real-world space, and a virtual camera 118 existing in the virtual space is set up so as to have the same position and orientation as one of the real-world cameras 102*a*, 102*b*, 102*n*, but in the virtual space, i.e. it is co-located. The co-located virtual camera 118 therefore has the same view of the 3D model 112 as the co-located real-world camera has of the scene. The real-world camera has a field of view that is aligned with the field of view of the virtual camera 118.

As the physical location of the real-world cameras is known from the alignment step, it is possible to align the virtual camera 118 with the real-world camera's position so that the offset between the virtual camera 118 and the generated 3D model is the same as the offset between the real-world camera and the scene. The virtual camera 118 is given the identical projection parameters of the real camera to which it is paired. This includes, image size, field of view, intrinsics, and distortion. This means that scene objects captured from both cameras will project to the same locations in the image.

Unlike the co-located real-world camera, the virtual camera 118 does not capture its viewpoint as such, but instead is able to render its viewpoint using the detailed knowledge of the 3D model 112. The pixels of the depth map contain the distance of the scene objects along the z-axis of the camera. This rendering process can be performed using rasterisation, or ray tracing. This rendered image is then taken as a high fidelity depth map. A high fidelity depth map 116 is therefore generated from the 3D model 112 and the known position and orientation of the virtual camera 118. The high fidelity depth map 116 is very accurate to the 3D model 112 and therefore to the scene.

Pixels from the perceived depth map which represent objects outside of the known scene boundaries are removed from the image. This segmentation is done to remove extraneous information from the depth maps which will degrade the performance of the neural network. More sophisticated segmentations methods can be used here to further remove unwanted depth information from the perceived depth maps. This segmentation is also applied to the RGB (colour) data.

The high fidelity depth map 116 is fed into the neural network 106 as a network label 120 (i.e. a network target). The neural network 106 also receives as its input 108 the perceived depth map generated by the real-world camera with which the virtual camera 118 is co-located.

As a result, the neural network 106 receives both a perceived depth map and a high fidelity depth map having an aligned field of view. The perceived depth map shows a perceived representation of the view of the scene from the perspective of the real-world camera, and the high fidelity depth map shows an accurate representation of the view of the scene.

The neural network 106 therefore takes both of these inputs and is trained on the basis that the perceived depth map is indicative of the high fidelity depth map. In other words it is trained to recognise that when a camera captures a depth map resembling the perceived depth map, the view of the scene being captured is actually likely to resemble the high fidelity depth map. Similarly, when a camera captures a depth map sharing characteristics with the perceived depth map, those characteristics are actually likely to map onto characteristics in the high fidelity depth map.

The neural network 106 may also receive a perceived colour map as a training input. The perceived colour map is captured by the co-located real camera and is used to train the neural network 106 to gain information about the high fidelity depth map based on the perceived colour map. Such information may include the location of a mouth on a human face, for example.

The output 122 of this training is a neural network that has undergone machine learning to be able to more accurately determine and capture depth of a scene. When the neural network is operated in a live phase, capturing live volumetric video for an audience and the like, it is able to increase the fidelity of captured (a.k.a. perceived) depth maps in less than 33 ms.

Similar principles can be used for training the neural network with colour maps, to recognise that a given perceived colour map is indicative of a given high fidelity colour map.

Figure 3A:
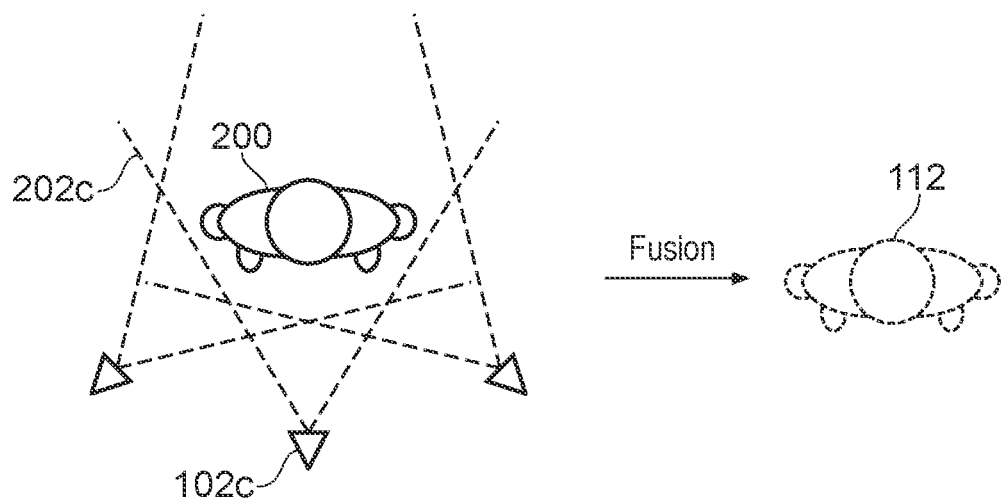
FIG. 3A is a perspective view of the generation of a 3D model.

FIG. 3A illustrates the alignment and fusion processes used to generate the high fidelity 3D model 112. As can be seen, three cameras are set up around the scene 200 and each has a field of view. A first camera 102*c* is positioned so as to have a first field of view 202*c* of the scene. The fields of view of the cameras overlap one another, and in particular there is some significant overlap between adjacent cameras. The overlapping depth maps are aligned and fused to generate a high fidelity 3D model 112.

Figure 3B:
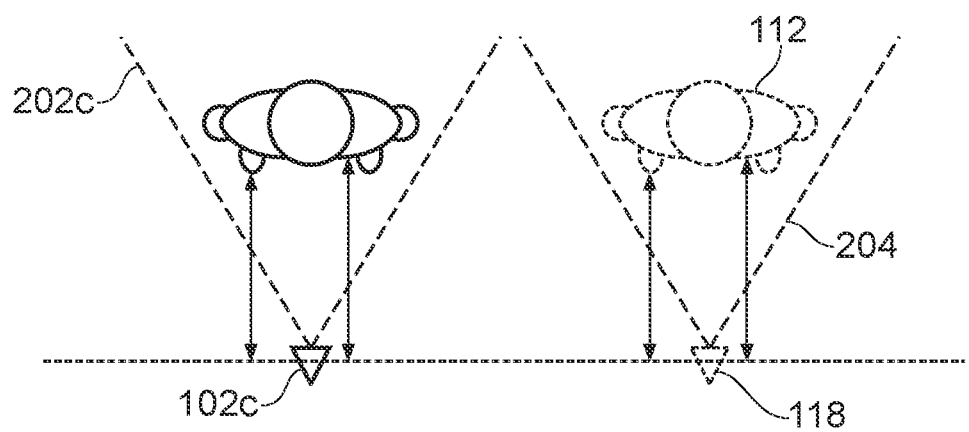
FIG. 3B is a perspective view showing co-location of a virtual camera with a real camera.

FIG. 3B shows the co-location of a virtual camera to generate a high fidelity depth map. The virtual camera 118 is co-located with the first camera 102*c*, and so has a virtual field of view 204 that is aligned with the first field of view 202*c*. The virtual camera 118 has a corresponding position and orientation in virtual space to the position and orientation of the first camera 102*c* in real space.

Figure 3C:
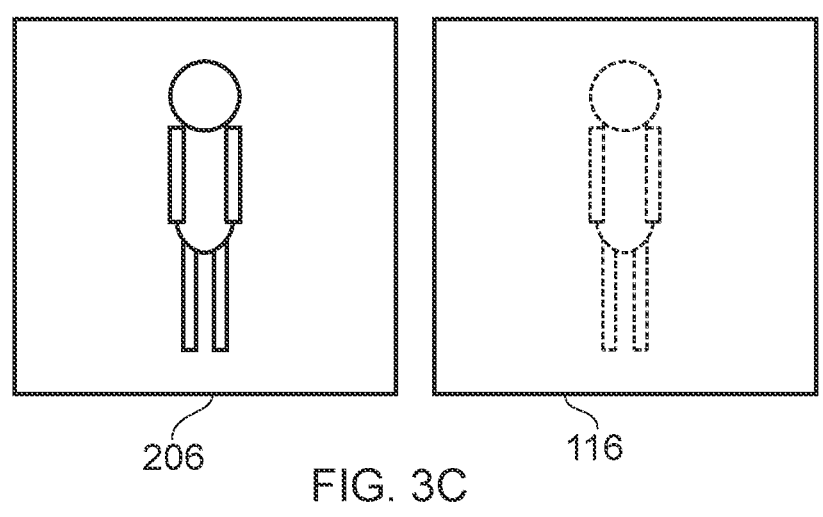
FIG. 3C shows a perceived depth map and a high fidelity depth map generated using the described methods.

The outputs of each of the first camera 102*c* and the virtual camera 118 are shown in FIG. 3C. The output of the first camera 102*c* is a perceived depth map 206, i.e. a perceived representation of the scene from the perspective of the first camera 102*c*. The output of the virtual camera 118 is a high fidelity depth map 116, i.e. an accurate representation of the 3D model 112 from the perspective of the virtual camera 118 (and therefore an accurate representation of the scene 200 from the perspective of the first camera 102*c*).

Figure 4A:
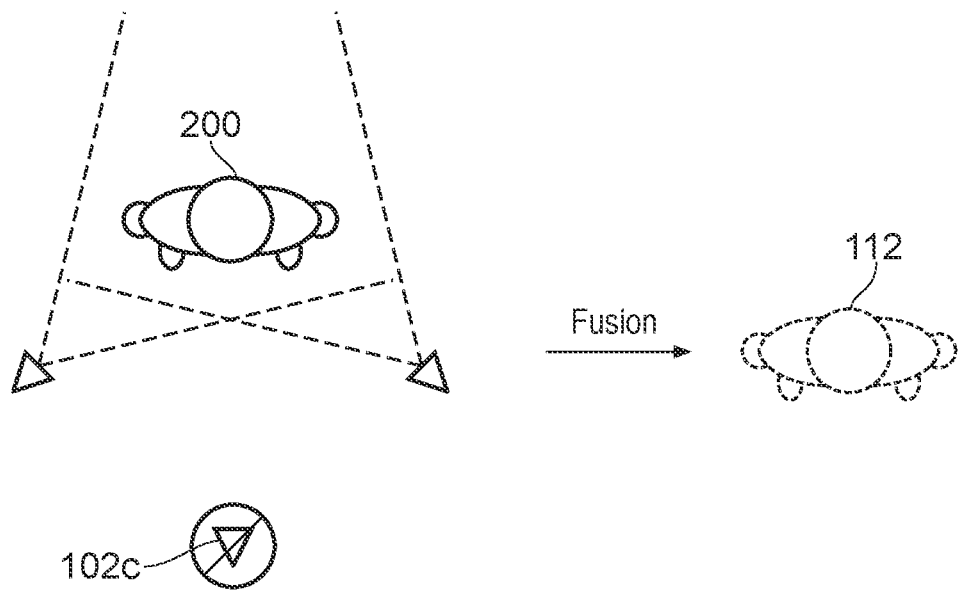
FIG. 4A is a perspective view of the generation of a 3D model.

FIG. 4A shows an embodiment in which the depth map of the first camera is omitted from the process for generating the 3D model. As can be seen, the first camera 102*c* is inactive during the collection of depth maps for generating the 3D model 112. In practice, the first camera 102c may in fact be active at this time and capturing a perceived depth map, but this perceived depth map will not be used in the generation of the high fidelity 3D model 112.

The omission of the first camera 102c in the generation of the 3D model 112 enables the first camera 102c to be positioned further away from the scene 200. A camera that is positioned at a greater distance from the scene outputs a noisier depth map, i.e. a low quality depth map. If the noise is too high (resulting in a poor signal-to-noise ratio), the inclusion of this depth map in the generation of the 3D model would actually reduce the accuracy of the 3D model to the scene, meaning it is preferable to omit this data from the fusion process.

Figure 4B:
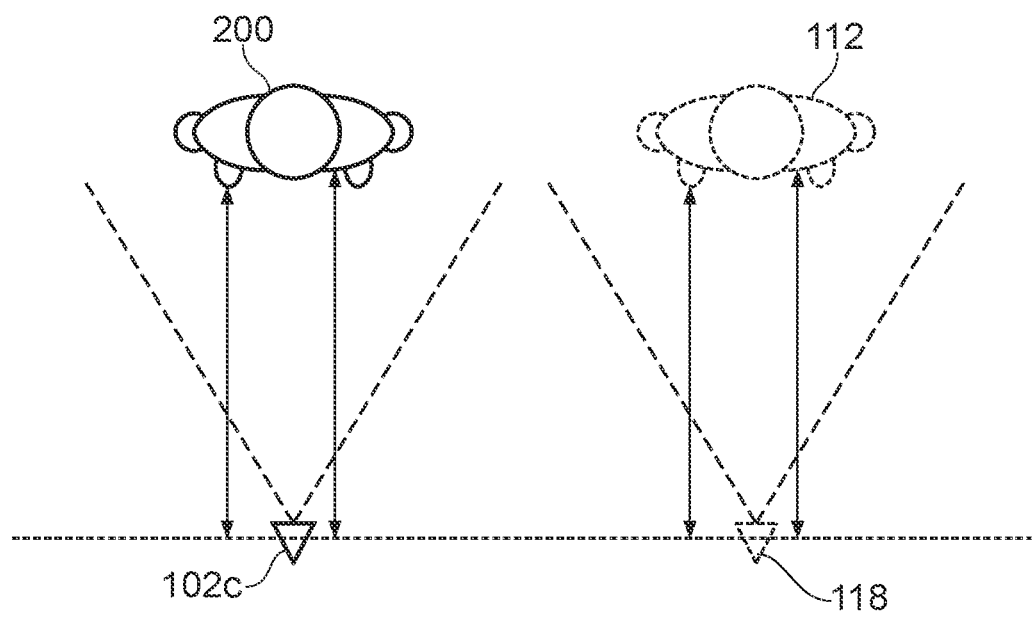
FIG. 4B is a perspective view showing co-location of a virtual camera with a real camera.

However, as can be seen in FIG. 4B, the virtual camera 118 can be co-located with the first camera 102c, enabling the neural network 106 to be trained with low quality depth maps. The omission of the low quality depth map in the generation of the 3D model results in a 3D model 112 having a higher fidelity.

Different types of depth cameras have different properties which dictate the accuracy of the depth data at different positions relative to the scene and/or lighting conditions. One option for the process, exemplified by FIGS. 4A and 4B, is to use depth sensors that perform very well over short ranges to capture the high fidelity 3D model, whilst positioning additional cameras of a different type at longer ranges, for the purpose of capturing perceived depth maps for training the neural network.

Figure 5:
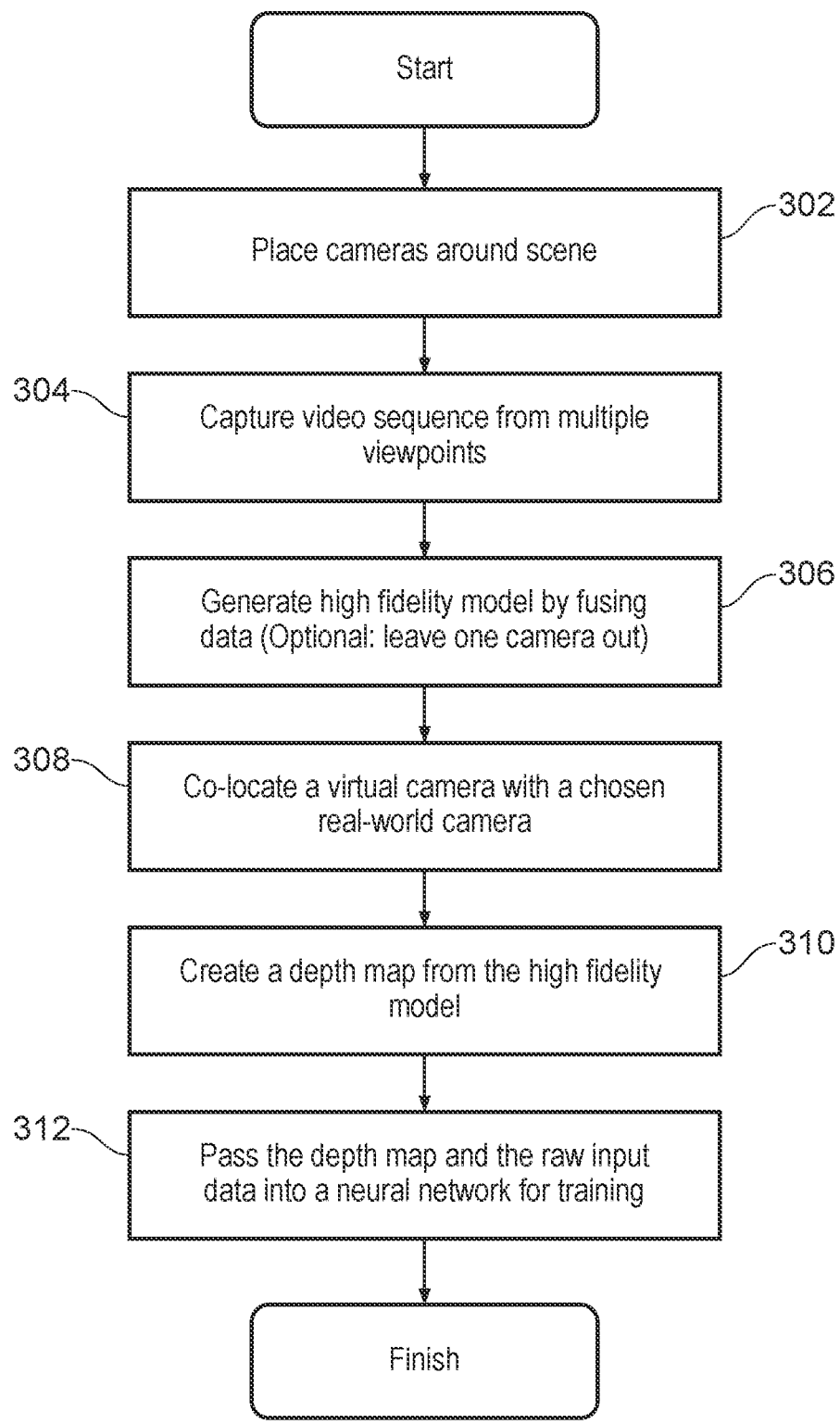
FIG. 5 is a flow diagram showing the steps of training a neural network for capturing volumetric video of a scene.

FIG. 5 shows a flow diagram summarising the described method of training a neural network. At a first step, cameras are placed around the scene 302. Video sequence is captured from multiple viewpoints 304, i.e. from the multiple cameras placed around the scene. A high fidelity 3D model is generated by fusing the depth data from the cameras 306. As discussed with respect to FIGS. 4A and 4B, the data of one camera may be omitted if it is likely to reduce the fidelity of the 3D model. A virtual camera is co-located with a chosen real-world camera 308. This may be a camera whose data was omitted in the previous step 306. A high fidelity depth map is generated from the 3D model based on the location and orientation of the virtual camera 310. Finally, the high fidelity depth map and the raw input data (i.e. the perceived depth map) are input into the neural network to train the neural network 312.

Although only real-world scenes have been described above, it is possible that the neural network can be trained based on scenes that are generated and take place in a virtual world. The method described thus far applies equally in this scenario. In this scenario, the scene is generated virtually and a number of perceived depth maps are captured from a number of positions and orientations in the virtual space. Accurate knowledge of the scene is already known as the scene was generated virtually, so no fusion process needs to take place to generate the 3D model. In this sense the scene and the 3D model are the same. A high fidelity depth map is generated from the same co-located perspective as one of the perceived depth maps. The two co-located depth maps are input into the neural network for training.

As with the above, training the neural network to increase the fidelity to the scene of captured depth maps has been discussed in detail, but it will be appreciated that the above method can be equally applied to training the neural network to increase the fidelity to the scene of captured colour maps.

Although the invention has been described above with reference to one or more preferred embodiments, it will be appreciated that various changes or modifications may be made without departing from the scope of the invention as defined in the appended claims.

The invention claimed is:

1. A method of training a neural network for capturing volumetric video, comprising:

generating a 3D model of a scene;

using the 3D model to generate a high fidelity depth map;

capturing a perceived depth map of the scene, having a field of view that is aligned with a field of view of the high fidelity depth map; and training the neural network based on the high fidelity depth map and the perceived depth map, wherein the high fidelity depth map has a higher fidelity to the scene than the perceived depth map has.

2. The method of claim 1, wherein training the neural network based on the high fidelity depth map and the perceived depth map comprises training the neural network to increase the fidelity to the scene of captured depth maps.

3. The method of claim 2, wherein training the neural network to increase the fidelity to the scene of captured depth maps comprises training the neural network to recognise that the perceived depth map is indicative of the high fidelity depth map.

4. The method of claim 2, wherein training the neural network to increase the fidelity to the scene of captured depth maps comprises training the neural network to increase, in less than 33 ms, the fidelity to the scene of captured depth maps.

5. The method of claim 1, further comprising:

capturing a first colour map of the scene, having a field of view that is aligned with the field of view of the high fidelity depth map; and training the neural network based on the high fidelity depth map and the first colour map.

6. The method of claim 5, wherein training the neural network based on the high fidelity depth map and the first colour map comprises training the neural network to recognise that a colour feature of the first colour map is indicative of a depth feature of the high fidelity depth map.

7. The method of claim 1, further comprising:

using the 3D model to generate a high fidelity colour map;

capturing a perceived colour map of the scene, having a field of view that is aligned with a field of view of the high fidelity colour map; and training the neural network based on the high fidelity colour map and the perceived colour map, wherein:

the high fidelity colour map has a higher fidelity to the scene than the perceived colour map has.

8. The method of claim 7, wherein training the neural network based on the high fidelity colour map and the perceived colour map comprises training the neural network to increase the fidelity to the scene of captured colour maps.

9. The method of claim 8, wherein training the neural network to increase the fidelity to the scene of captured colour maps comprises training the neural network to recognise that the perceived colour map is indicative of the high fidelity colour map.

10. The method of claim 1, wherein generating a 3D model of a scene comprises: capturing a plurality of depth maps of the scene; and generating a 3D model of the scene based on the plurality of depth maps.

11. The method of claim 1, further comprising repeating the method using at least one further depth map or scene.

12. A neural network that has been trained using the method of claim 1.

13. A method of capturing volumetric video, comprising capturing volumetric video using a neural network that has been trained using the method of claim 1.

14. Apparatus for training a neural network for capturing volumetric video, comprising:
- a neural network;
- a plurality of cameras configured to generate a 3D model of a scene; and
- a processor configured to use the 3D model of the scene to generate a high fidelity depth map;

wherein:
- a first subset of the plurality of cameras is further configured to capture a perceived depth map of the scene, the perceived depth map having a field of view that is aligned with a field of view of the high fidelity depth map;
- the neural network is configured to receive, as training inputs, the high fidelity depth map and the perceived depth map; and
- the high fidelity depth map has a higher fidelity to the scene than the perceived depth map has.

15. Apparatus according to claim 14, wherein when capturing the perceived depth map, the first subset of the plurality of cameras are co-located with cameras of the plurality of cameras when generating the 3D model.

16. Apparatus according to claim 14, wherein the plurality of cameras comprises stereoscopic cameras.

17. Apparatus according to any of claim 14, wherein the plurality of cameras comprises time of flight cameras.

18. Apparatus for training a neural network for capturing volumetric video, comprising:
- a neural network; and
- a computer program configured to:
  - generate a 3D model of a scene;
  - use the 3D model to generate a high fidelity depth map; and
  - generate a perceived depth map of the scene, the perceived depth map having a field of view that is aligned with a field of view of the high fidelity depth map, wherein:
- the neural network is configured to receive, as training inputs, the high fidelity depth map and the perceived depth map; and
- the high fidelity depth map has a higher fidelity to the scene than the perceived depth map has.

19. Apparatus for training a neural network for capturing volumetric video, comprising:
- a neural network;
- a first plurality of cameras configured to generate a 3D model of a scene;
- a processor configured to use the 3D model of the scene to generate a high fidelity depth map; and
- a second camera, not included in the first plurality of cameras, configured to capture a perceived depth map of the scene, the perceived depth map having a field of view that is aligned with a field of view of the high fidelity depth map;

wherein:
- the neural network is configured to receive, as training inputs, the high fidelity depth map and the perceived depth map; and the high fidelity depth map has a higher fidelity to the scene than the perceived depth map has.

20. Apparatus according to claim 19, wherein the second camera is configured to be positioned farther from the scene than the first plurality of cameras are from the scene.

* * * * *